United States Patent
Clements et al.

(10) Patent No.: US 9,205,784 B2
(45) Date of Patent: Dec. 8, 2015

(54) DASH DOCK AND CRADLE DESIGN

(71) Applicant: Winnebago Industries, Inc., Forest City, IA (US)

(72) Inventors: Matthew Clements, Clive, IA (US); Steven Jergenson, L., Clear Lake, IA (US); Craig Casanova, Albert Lea, MN (US); Bob Ritter, Clear Lake, IA (US)

(73) Assignee: Winnebago Industries, Inc., Forest City, IA (US)

( * ) Notice: Subject to any disclaimer, the term of this patent is extended or adjusted under 35 U.S.C. 154(b) by 0 days.

(21) Appl. No.: 14/208,826

(22) Filed: Mar. 13, 2014

(65) Prior Publication Data

US 2014/0263511 A1    Sep. 18, 2014

Related U.S. Application Data

(60) Provisional application No. 61/789,088, filed on Mar. 15, 2013.

(51) Int. Cl.
*B60R 7/06* (2006.01)
*B60R 11/02* (2006.01)
*B60R 11/00* (2006.01)

(52) U.S. Cl.
CPC .......... *B60R 11/02* (2013.01); *B60R 2011/0005* (2013.01); *B60R 2011/0061* (2013.01); *B60R 2011/0084* (2013.01); *B60R 2011/0092* (2013.01)

(58) Field of Classification Search
CPC .. B60R 7/06; B60R 11/02; B60R 2011/0005; B60R 2011/0042; B60R 2011/0047; B60R 2011/008; B60R 2011/0092; B60R 2011/0084; B60R 11/0229
See application file for complete search history.

(56) References Cited

U.S. PATENT DOCUMENTS

| | | | | |
|---|---|---|---|---|
| 4,079,604 | A | * | 3/1978 | Anderegg ........................ 70/58 |
| 4,105,246 | A | * | 8/1978 | Trumbull ..................... 296/97.7 |
| 5,025,919 | A | * | 6/1991 | Brinker et al. ................ 206/214 |
| 5,779,205 | A | * | 7/1998 | Ching ......................... 248/205.8 |
| 5,833,101 | A | * | 11/1998 | Watkins ........................ 224/275 |
| 5,979,724 | A | * | 11/1999 | Loewenthal et al. ......... 224/483 |
| 6,116,485 | A | * | 9/2000 | Watkins ........................ 224/275 |
| 6,131,986 | A | * | 10/2000 | Rosen ......................... 296/97.13 |
| 6,155,525 | A | * | 12/2000 | Joanisse et al. ............ 248/287.1 |
| 6,381,133 | B1 | * | 4/2002 | Chen ......................... 361/679.42 |
| 6,705,690 | B1 | * | 3/2004 | O'Brien ..................... 312/334.6 |
| 7,143,805 | B1 | * | 12/2006 | Weir ......................... 160/370.22 |
| 7,431,376 | B1 | * | 10/2008 | Marszalek .................... 296/97.7 |
| 7,591,498 | B2 | * | 9/2009 | Busha et al. ................ 296/24.34 |
| 7,950,610 | B2 | * | 5/2011 | Sawai ............................. 248/131 |
| 8,072,743 | B2 | * | 12/2011 | Kissel ....................... 361/679.21 |
| 8,649,161 | B2 | * | 2/2014 | Kato ......................... 361/679.01 |
| 2008/0041540 | A1 | * | 2/2008 | Li ............................. 160/370.22 |
| 2009/0230262 | A1 | * | 9/2009 | Chiu ........................... 248/206.3 |
| 2012/0199621 | A1 | * | 8/2012 | Yoon ............................. 224/483 |
| 2014/0138418 | A1 | * | 5/2014 | Dunn ............................. 224/483 |
| 2014/0183238 | A1 | * | 7/2014 | Lin ............................... 224/483 |
| 2014/0223065 | A1 | * | 8/2014 | Jolda et al. .................... 710/303 |
| 2014/0246468 | A1 | * | 9/2014 | Montgomery et al. ....... 224/548 |

* cited by examiner

*Primary Examiner* — Brian D Nash
(74) *Attorney, Agent, or Firm* — Davis, Brown, Koehn, Shors & Roberts, P.C.; Sean D. Solberg (57) ABSTRACT

The sliding display device system is a device for mounting a display devices in a recreational vehicle that allows for easy repositioning of the display device along a horizontal axis between the driver and passenger side along the dashboard.

13 Claims, 12 Drawing Sheets

Fig. 1

SECTION E-E

DASH DOCK AND CRADLE DESIGN

CROSS-REFERENCE TO RELATED APPLICATION(S)

This application claims priority from U.S. Provisional Application 61/789,088, filed Mar. 15, 2013, and entitled "Dash Dock and Cradle Design," which is hereby incorporated herein by reference in its entirety.

FIELD

The present invention relates to display device dock systems for recreational vehicles.

BACKGROUND

As people become more mobile and spend a greater amount of time traveling and away from home, demand rises for electronic devices that can be used outside the home environment. Tablet computers including a large display screen and a touch screen interface are becoming more prevalent in today's society due to the ease in which they can be used on the go. Because using a tablet computer in a vehicle may be cumbersome, numerous devices have been developed to fixedly display a tablet in a vehicle such as mounts for a dashboard or the rear of a seat. Yet when it comes to using a display in recreation vehicle, these prior art solutions have significant problems. Because these vehicles tend to be very wide (a Class A coach is 96" across), it is difficult to mount a tablet in one spot on a dashboard that can be easily seen or accessed by both the driver and the passenger. For example, if a tablet is mounted halfway between the driver and passenger it may be difficult for the driver to see a map needed for navigation. And likewise, it may be difficult for the passenger to clearly see a movie being displayed. Accordingly, there is a need in the art for a mount that can be positioned between the driver and passenger depending on required use of the tablet.

BRIEF SUMMARY

The present invention is an apparatus for slidably mounting an display device such as a tablet computer, iPad®, or information center (having backup monitor, GPS and the like) in a recreational vehicle or other large vehicle so that the position of the mounted device can be easily adjusted in a horizontal direction between the passenger and driver.

In one embodiment, a slidable mounting apparatus for a vehicle has at least one slide groove assembly fixedly attached to a vehicle and at least one mounting assembly, wherein said mounting assembly further comprises at least one trolley assembly; and said trolley assembly is slidably connected to said slide groove assembly.

In another embodiment, the mounting assembly is a display device mounting assembly and the display device mounting assembly further comprises a display device mounting bracket fixedly attached to said trolley assembly for securing a display device to the bracket.

In still another embodiment, the mounting assembly is a work station, wherein said work station further comprises a work surface and said work surface fixedly connected to the trolley assembly.

In still a further embodiment, said trolley assembly further comprises at least one friction reduction member, wherein said friction reduction member is a wheel, bearing, low friction nylon/plastic, or other means known in the art of reducing friction between moving parts.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 12 B depicts a perspective view of an alternate workstation embodiment.

DETAILED DESCRIPTION

The various systems and devices disclosed herein relate to apparatus, systems and method for use in recreational vehicles. More specifically, various embodiments relate to various apparatus, systems and methods for adjusting the position of certain components, namely a dash display device. Although the sliding display device system has been described with reference to certain exemplary embodiments, persons skilled in the art will recognize that changes may be made in form and detail without departing from the spirit and scope of the apparatus, systems and methods.

Exemplary embodiments of the apparatus, systems and methods comprise a sliding dash system and slidable mounting apparatus for a recreational vehicle, which for brevity will be referred to herein as the "dash system."

Figure 1:
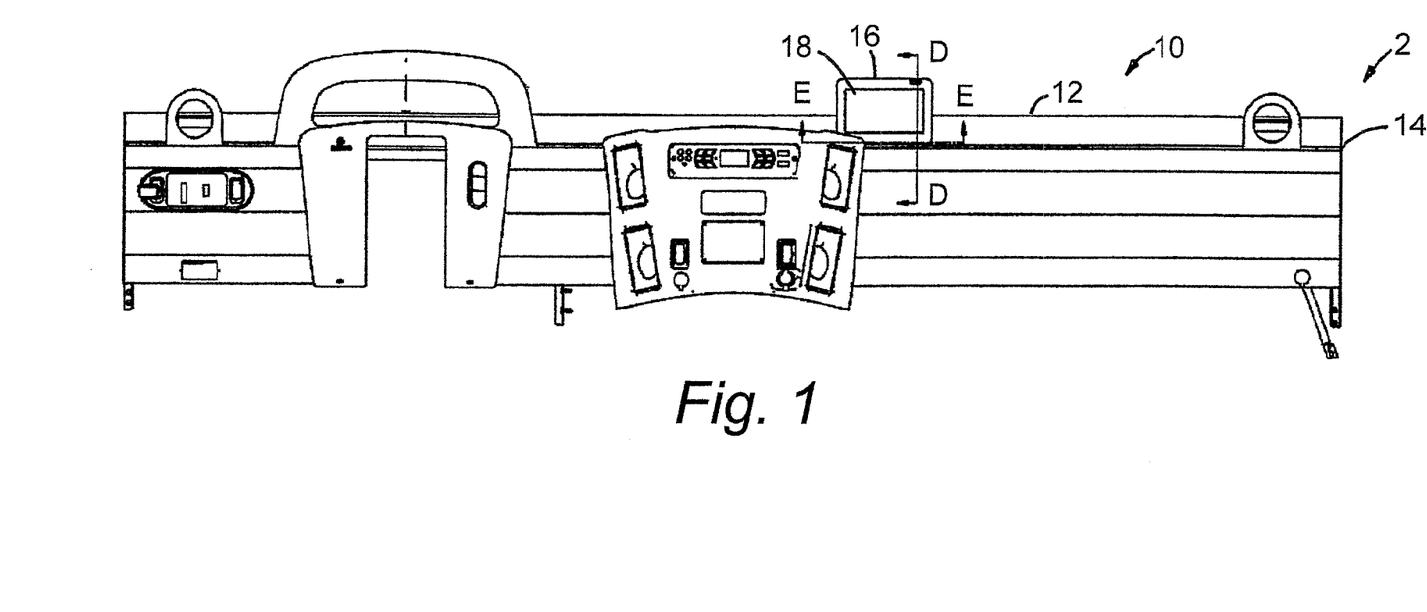
FIG. 1 is a front view of one implementation of the sliding display device system.

Turning to the drawings in greater detail, FIG. 1 depicts an exemplary embodiment of the sliding in-dash system 10. In these embodiments, a vehicle dashboard 12 is shown having one or more slide grooves 14 running substantially horizontally along the dashboard 12. The embodiment further comprises one or more display device mounting, or "trolley" assemblies 16. Said display device mounting assemblies further comprising one or more brackets 20 configured to hold a display device (as described in detail in reference to FIG. 2, which is the cross-section of section D-D).

In certain exemplary embodiments, a display device 18 may be placed or otherwise secured to the trolley assembly 16. In certain embodiments, the display device is simply placed on the trolley assembly, but in other embodiments, the display device 18 is secured to the trolley through brackets, clips, adjustable components or other means known in the art. In certain implementations, the display device can be fully or partially integrated with the vehicle electrical system, such as a touch-screen control mechanism, radio, GPS display, map display, music or satellite radio control device, mapping device, climate control device, vehicle control mechanism, reverse camera display, a tablet computer such as an iPad®, a laptop computer, a digital music player, or any of a variety of electronic components, either of the consumer electronic or vehicle electronic varieties. In certain embodiments, brackets are affixed directly from the display device 18 to the trolley assembly 16. The trolley assembly 16 is in turn slidably connected to the slide grooves 14 such that the display device can be made to slide horizontally from the driver side (generally at 1) to the passenger side (generally at 2), as described elsewhere herein.

Figure 2:
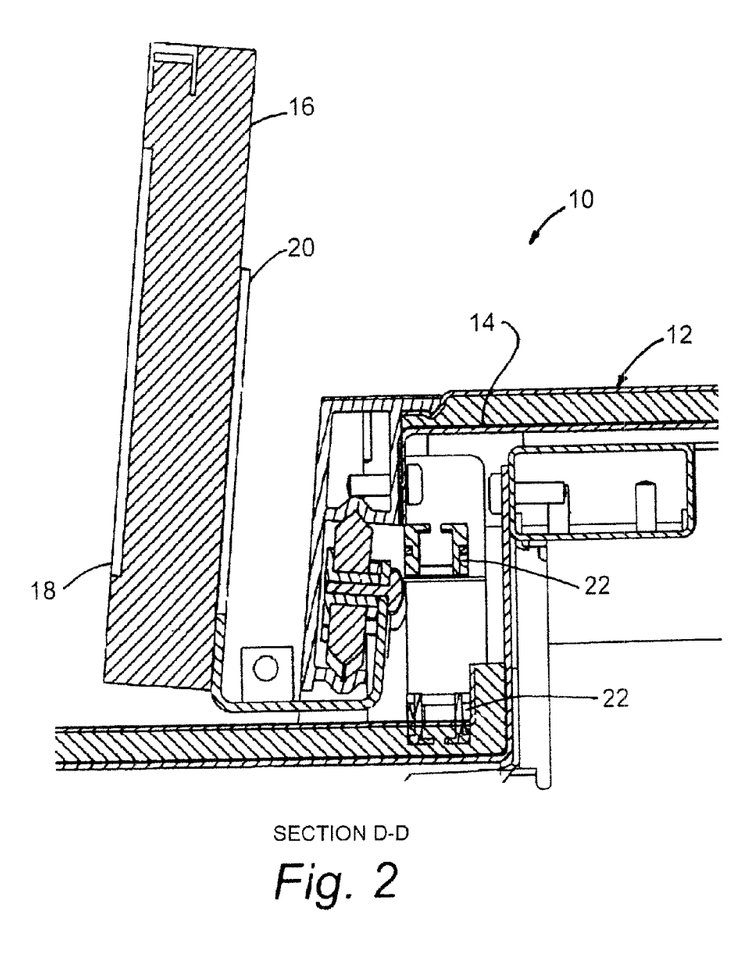
FIG. 2 is a cross-sectional view of the implementation of FIG. 1 from along lines D-D.
Figure 3:
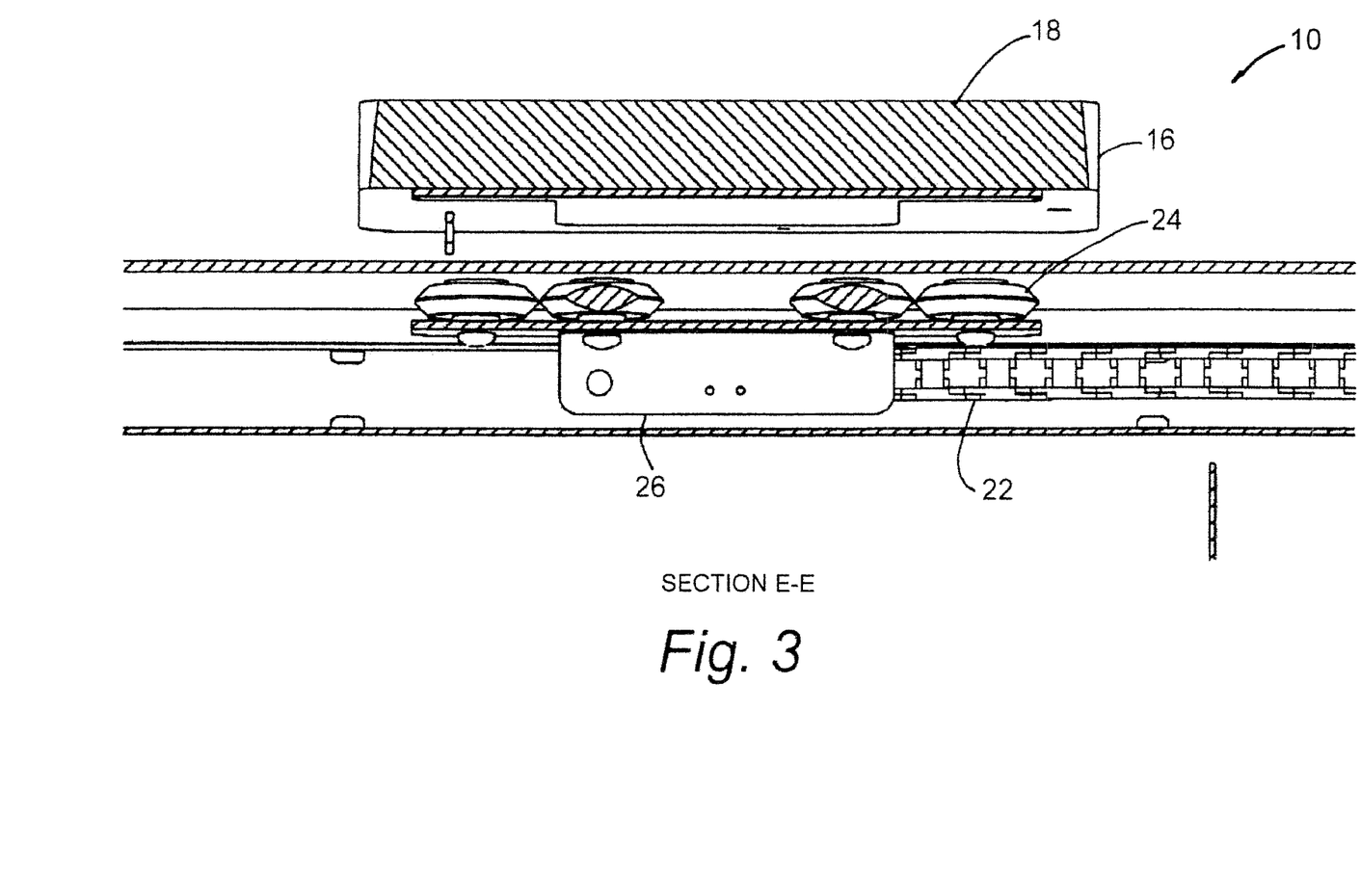
FIG. 3 is a bottom view of the implementation of FIG. 1 from the point of view of reference letter E.
Figure 4:
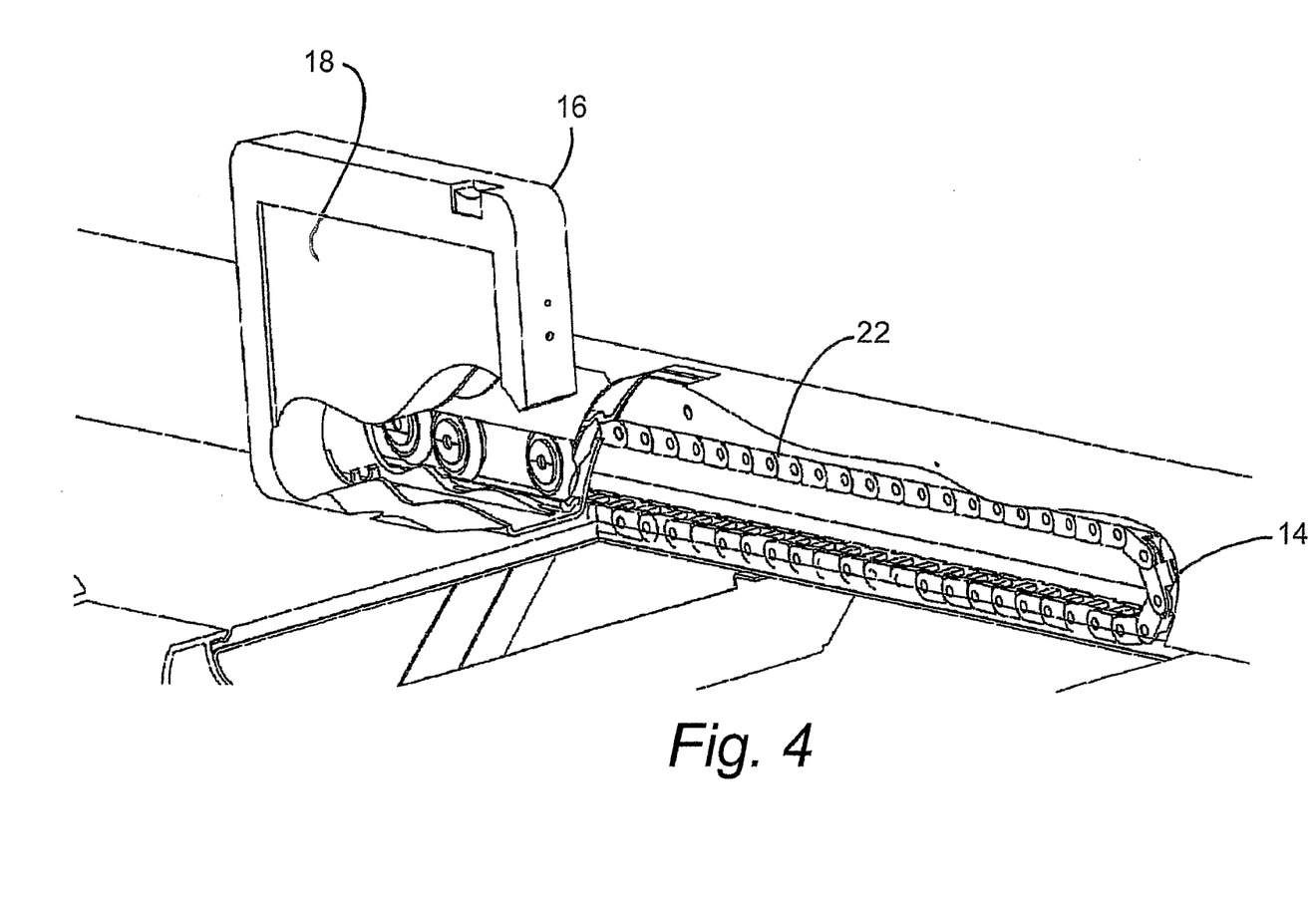
FIG. 4 is a perspective cutaway view of an exemplary embodiment of the system showing the chain system.

FIG. 2 is a cross-sectional view of segment D-D in FIG. 1, showing an exemplary embodiment of the of the sliding dash system. As is shown in FIG. 3-4, certain exemplary embodiments further comprise a caterpillar or chain system 22 to facilitate movement of the display device along the slide grooves 14. In certain of these embodiments, the chain system 22 is configured to organize cords used to power the device or to use the device as an auxiliary input into the vehicles in-dash sound system. The chain system further allows smooth movement of the display device without cord bunching.

In certain implementations, the system comprises one or more slide grooves 14 and the trolley assembly 16 further comprises wheels 24, bearings, low resistance nylon/plastic-type material or other materials know in the art that reduce friction between the slide grooves 14 and the trolley assembly 16 during operation to facilitate sliding in a generally horizontal direction.

FIG. 3 depicts a bottom-view of the system from the point marked "E." In certain embodiments, the system comprises a chain connection member 26, which operationally couples the trolley 16 with the chain system 22.

FIG. 4 depicts a cutaway view of an embodiment of the system comprising the chain system, or caterpillar 22. In certain embodiments, the chain system is powered by a driven gear (not shown) to control the movement of the trolley 16 about the slide groove. In alternate embodiments, the chain system 22 is passively movable by the user, such as by hand. In yet further embodiments, the chain system 22 is functionally coupled to a locking mechanism. The slide grooves 14 can be manufactured by a number of means known in the art. For example, slide grooves 14 could be manufactured through extrusion. Other manufacturing methods are possible. The slide grooves may be manufactured from a number of materials such as plastic or metal. Other materials are possible.

Figure 5:
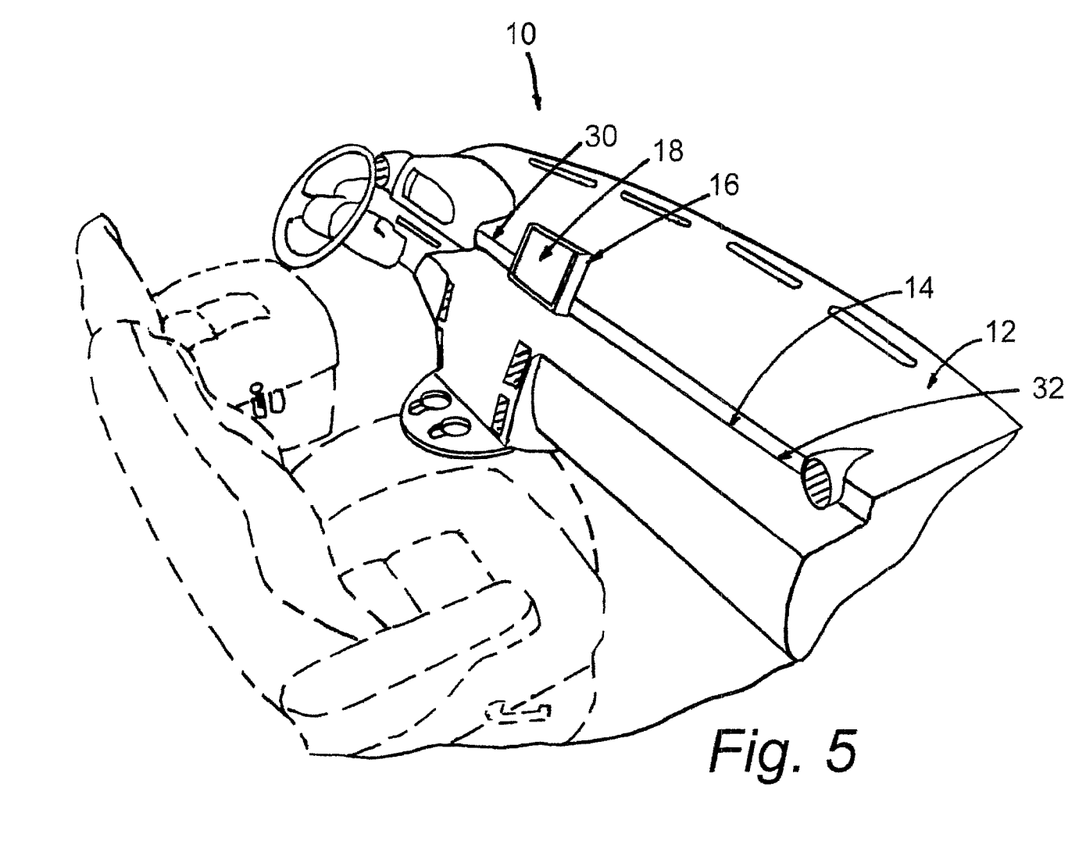
FIG. 5 is a perspective view of the interior of a recreational vehicle showing of an exemplary implementation of the display device mounting assembly.
Figure 6:
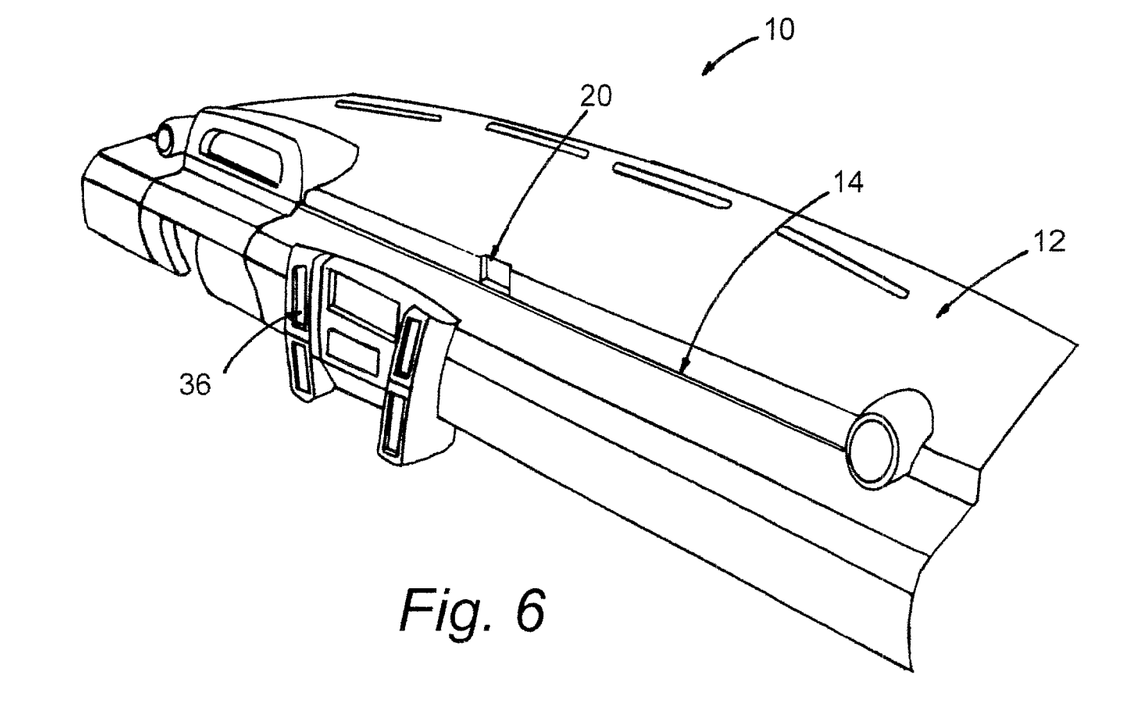
FIG. 6 is a perspective view of the interior of a recreational vehicle showing of an exemplary implementation of the display device mounting system prior to complete assembly of the vehicle.
Figure 7A:
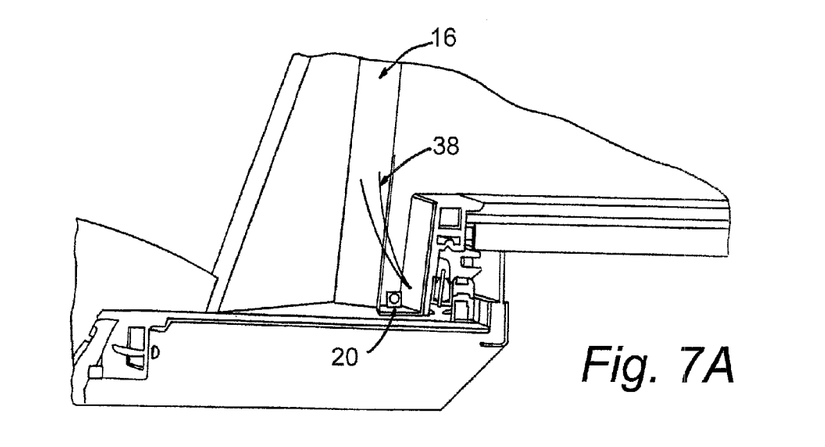
FIG. 7A is a side view of an exemplary embodiment showing the display device mount and the slide groove and wiring.
Figure 7B:
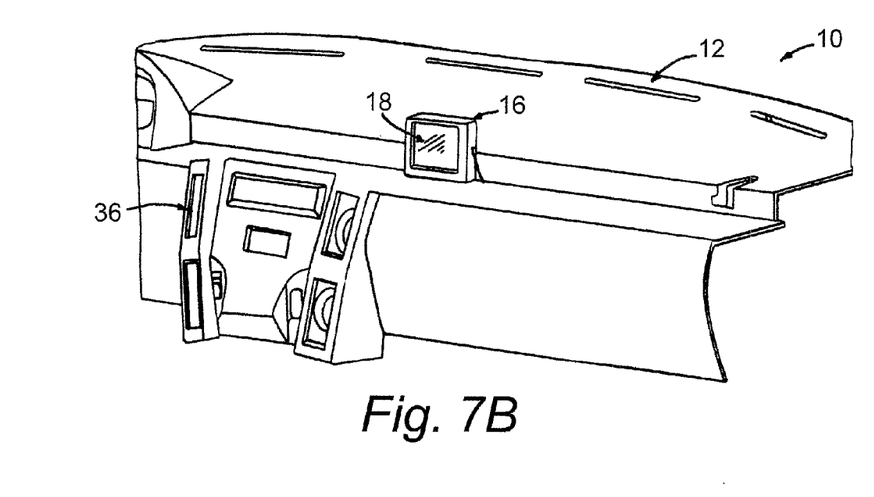
FIG. 7B is a further perspective view of a further embodiment showing the display device mount and dash.
Figure 8A:
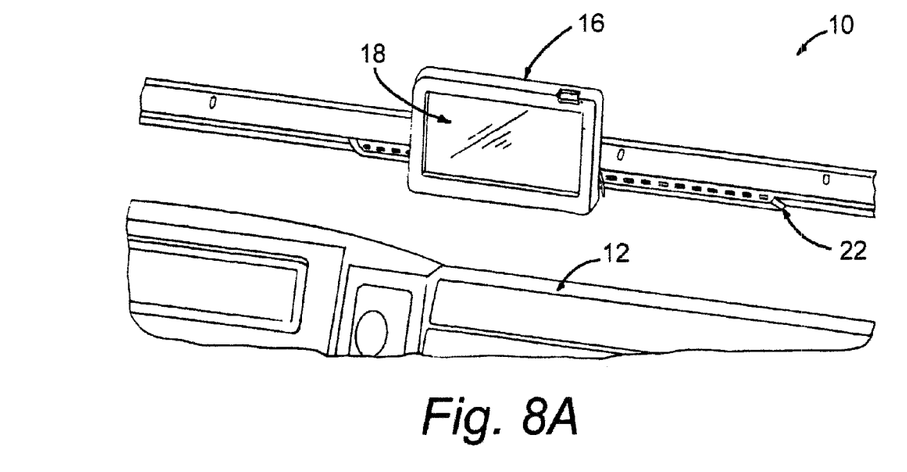
FIG. 8A is a cutaway view of an exemplary embodiment showing the display mounting device and chain.
Figure 8B:
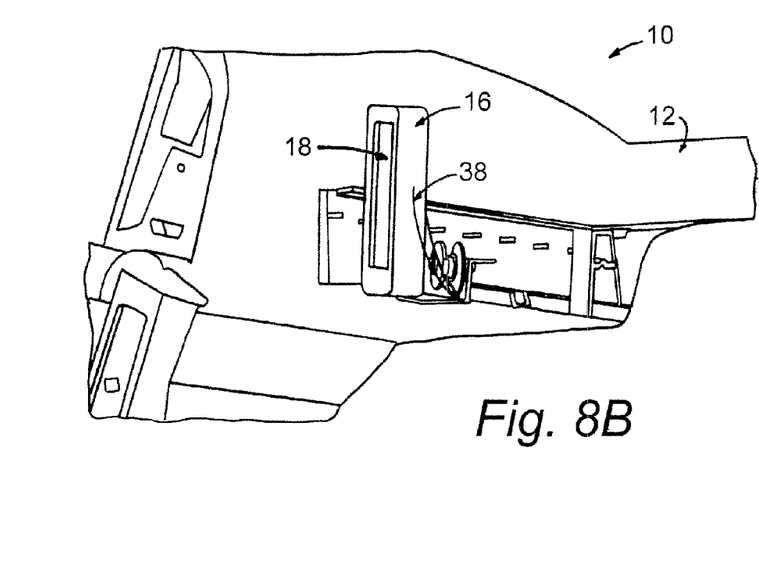
FIG. 8B is a perspective side view of an exemplary embodiment showing the display device mount and the chain system and wiring.
Figure 9A:
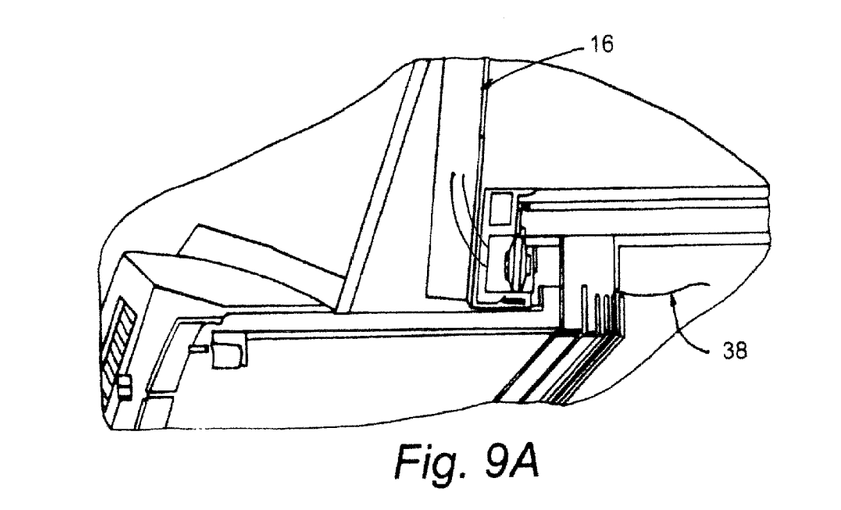
FIG. 9A is a side view of an exemplary embodiment showing the display device mount and the slide groove and wiring.
Figure 9B:
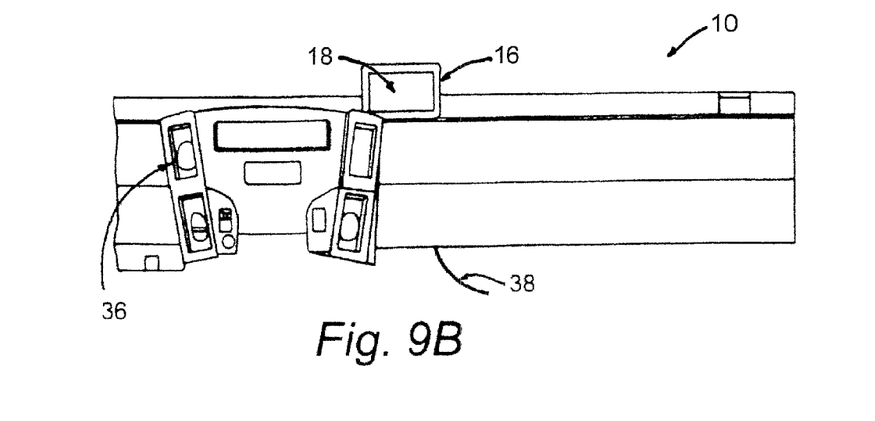
FIG. 9B is a further perspective view of a further embodiment showing the display device mount and dash.
Figure 10:
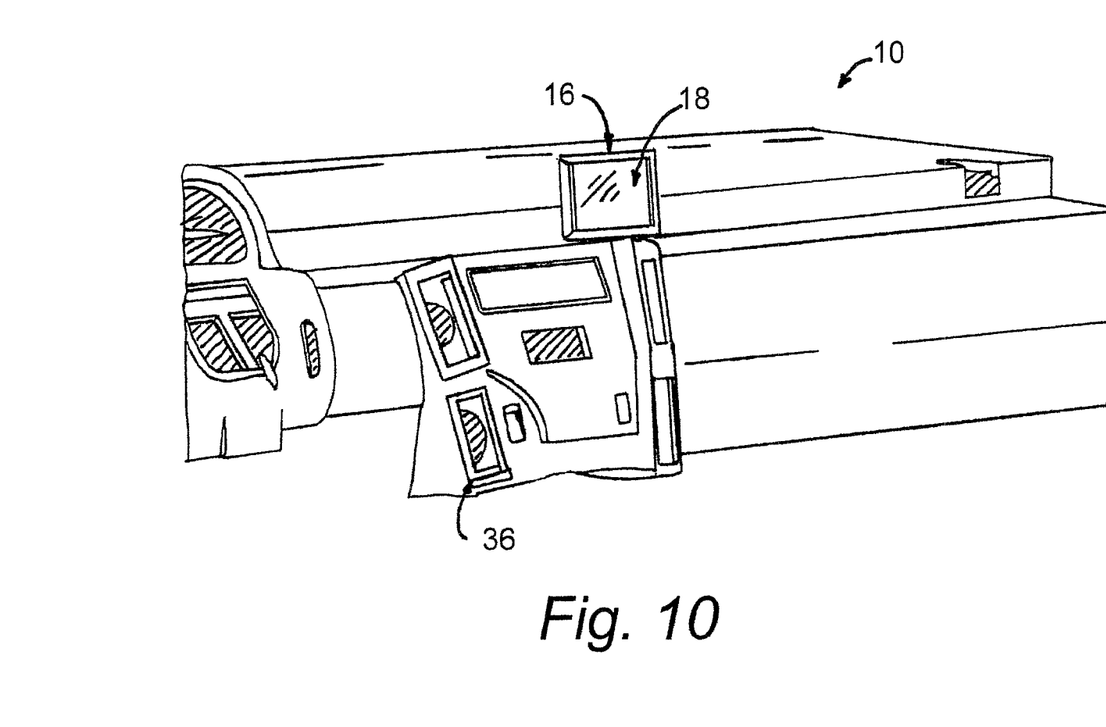
FIG. 10 is a further interior perspective view of the dash mounted system.

FIG. 5 depicts a further example of an exemplary embodiment of the system. In these embodiments, the slide groove 14 runs substantially horizontally across the vehicle dashboard 12 and is slidably connected to the trolley assembly 16 secured to a display device 18. In certain implementations, the trolley assembly is obscured from the user's view by the display device, and in further embodiments the trolley assembly is prominently visible to the user, depending on the configuration or type of display device being used, as discussed elsewhere herein. In yet further implementations, said slide gap assemblies further comprise one or more stop members at either end 30, 32 of the slide groove such that horizontal movement of the trolley assemblies 16 will be stopped once it reaches the end of the slide gap assemblies. As shown in FIG. 6, in certain of these embodiments the trolley further comprises at least one bracket 20.

FIGS. 7A-10 depict various exemplary embodiments of the system 10. As shown in FIG. 7B, the dashboard 12 further comprises an control center 36. In certain of these exemplary embodiments, the control center is in electrical or operational communication with the display device 18. In certain of these embodiments, this communication is by way of wiring 38, as would be apparent to one of skill in the art. In certain alternate embodiments, the wiring places the system in communication with other electronics, such as a remote hard drive or other processor (not shown).

Figure 11:
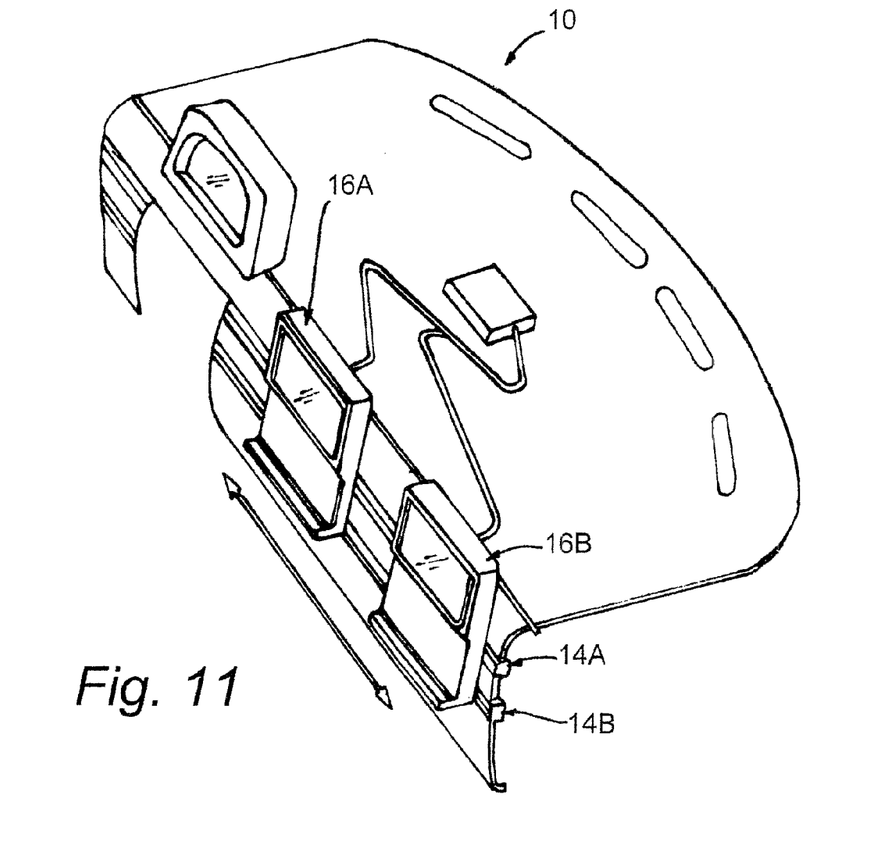
FIG. 11 depicts a perspective view of an exemplary embodiment of the system comprising multiple display devices.

As depicted in FIG. 11, certain embodiments of the system 10 comprise a plurality of trolleys 16A, 16B. In certain embodiments, the system comprises a plurality of slide grooves 14A, 14B. In certain of these embodiments, the first groove 14A is located on substantially the top of the center stack of dashboard 12 and the second groove 14B located on substantially the bottom of the center stack of the dashboard. The display device 18 mounting assembly extends from the top to the bottom of the face of the dashboard and moves horizontally from the driver side to the passenger side.

Figure 12A:
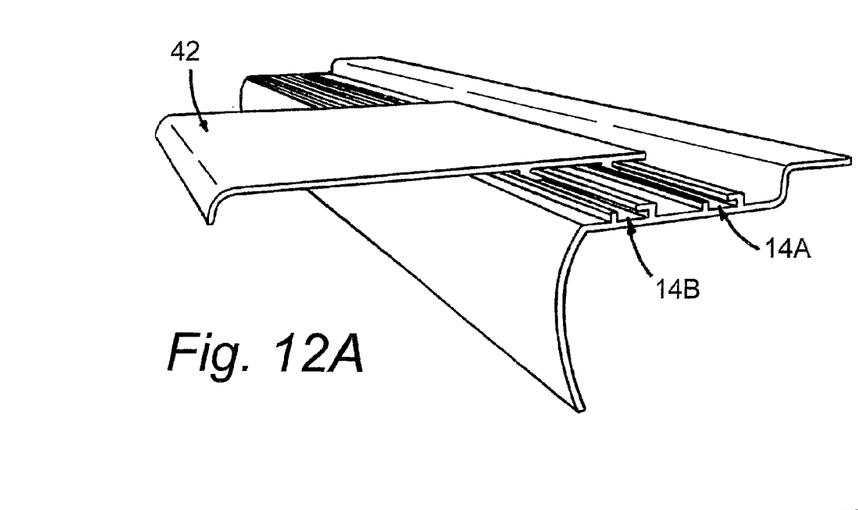
FIG. 12A depicts a perspective view of an alternate embodiment of the system configured as a workstation.
Figure 12B:
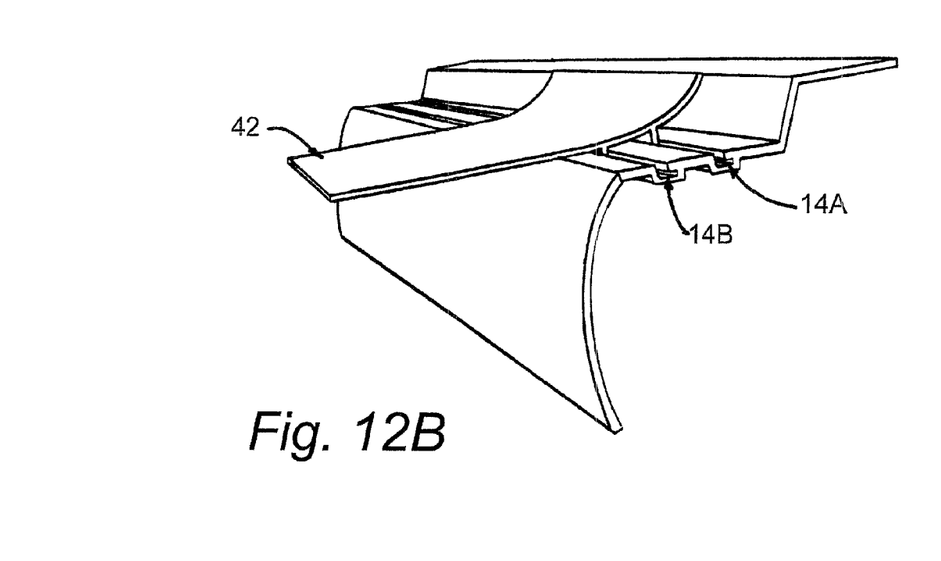

FIG. 12A-12B depict certain alternate embodiments of the system further comprise a work station assembly 40. The workstation has a work surface 42 to allow for the placement of a laptop computer, iPad, book, or other personal electronic device, or to perform work requiring a hard flat surface. In certain embodiments, the workstation assembly 40 further comprises one or more trolley assemblies fixedly connected to the work surface. In exemplary implementations, one or more workstation assemblies and one or more display device mounting assemblies are each slidably connected to the slide grooves 14A, 14B which may be useful if, for example, the driver required use of a tablet for navigation while simultaneously, the passenger required a work surface to work on a laptop computer. In certain embodiments, the slide grooves 14A, 14B protrude upwards from the surface of the dashboard. A work station assembly is slidably connected to two slide grooves 14A, 14B. In certain embodiments the ends of the slide grooves are open to allow the user to slide the trolley assemblies of the work station into the slide grooves when a work surface is required yet also to allow for removal of the work station assembly when it is no longer needed. Alternatively, a work station could be replaced with a display device mounting assemblies when the user wished to view a display device rather than utilize a work surface.

While the various systems in accordance with the present disclosure have been described as being used in connection with recreational vehicle applications, it is envisioned that the present systems disclosed may be used in other applications as well. It is understood that various modifications may be made to the embodiments of the presently disclosed sliding dash system. Therefore, the above description should not be construed as limiting, but merely illustrative of the variations described herein. It is also understood by one of skill in the art that this invention is useful for wide body vehicles in general, including commercial and noncommercial vehicles.

What is claimed is:

1. A slidable mounting device for a vehicle comprising:
   a. a vehicle further comprising a dashboard, the dashboard further comprising at least one slide groove;
   b. at least one trolley assembly configured to be slideably connected to the slide groove and further comprising a mounting assembly configured to support a mountable device; and
   c. a chain system.

2. The slideable mounting device of claim 1, wherein the mountable device is a display device.

3. The slideable mounting device of claim 2, wherein the display device is selected from the group consisting of: a touch-screen control mechanism, a radio, a GPS display, a map display device, a music or satellite radio control device, a climate control device, a vehicle control mechanism, a reverse camera display, a tablet computer, a digital music player, or any of a variety of electronic components, either of the consumer electronic or vehicle electronic varieties.

4. The slideable mounting device of claim 3, wherein the display device is electronically coupled to the vehicle electronic system.

5. The slideable mounting device of claim 1, wherein the mounting assembly is a display device mounting assembly further comprising a display device mounting bracket fixedly attached to the trolley assembly.

6. The slideable mounting device of claim 1, wherein the display device mounting bracket further comprises at least one device retaining member.

7. The slideable mounting device of claim 1, further comprising a friction reduction mechanism between the at least one trolley assembly and the at least one slide groove.

8. The slideable mounting device of claim 7, wherein the friction reduction mechanism is selected from the group consisting of: wheels, bearings, low resistance nylon, plastic, and grease.

9. A slideable mounting device for a vehicle comprising:
   a. a vehicle further comprising a dashboard, the dashboard further comprising at least one slide groove;
   b. at least one trolley assembly configured to be slideably connected to the slide groove and further comprising a mounting assembly configured to support a mountable device; and
   c. a chain system.

10. The slideable mounting device of claim 9, further comprising an electronic coupling.

11. The apparatus of claim 9 further comprising a mounting assembly locking member configured to prevent movement of the mounting assembly.

12. The slideable mounting device of claim 9 wherein the mounting assembly is a work station, wherein the work station further comprises a work surface, and the work surface fixedly connected to the trolley assembly.

13. The apparatus of claim 9 further comprising a cord organizing member.

* * * * *